United States Patent
Decker

(10) Patent No.: US 8,341,878 B2
(45) Date of Patent: *Jan. 1, 2013

(54) ZIP TREE TIE

(75) Inventor: Thomas J. Decker, Glen Allen, CA (US)

(73) Assignee: Zip-It Tree Ties, Roseville, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/053,057

(22) Filed: Mar. 21, 2011

(65) Prior Publication Data

US 2011/0167719 A1 Jul. 14, 2011

Related U.S. Application Data

(63) Continuation of application No. 12/182,126, filed on Jul. 29, 2008, now Pat. No. 7,908,793.

(60) Provisional application No. 60/952,856, filed on Jul. 30, 2007.

(51) Int. Cl.
*A01G 13/02* (2006.01)
*B65D 63/00* (2006.01)
*F16L 3/08* (2006.01)

(52) U.S. Cl. ........ 47/32.5; 24/16 PB; 24/16 R; 24/17 B; 24/17 AP; 24/30.5 R; 47/43; 47/42; 248/74.3

(58) Field of Classification Search ................ 47/42, 43, 47/32.5, 32.4, 32.6, 44, 46; 24/16 PB, 16 R, 24/30.5 R, 30.5 P, 17 B, 17 AP; 248/60, 248/74.3, 74.5, 218.4, 219.4, 230.8, 228.8; A01G 17/12, 17/08

See application file for complete search history.

(56) References Cited

U.S. PATENT DOCUMENTS

| | | | |
|---|---|---|---|
| 799,999 A | 9/1905 | Massard | |
| 1,844,024 A | 2/1932 | Weber | |
| 3,010,256 A | 11/1961 | Ise | |
| 3,226,882 A * | 1/1966 | Lichtenthaler | 47/42 |
| 3,667,710 A * | 6/1972 | Moody et al. | 248/71 |
| 4,222,198 A | 9/1980 | Napolitano et al. | |
| 5,293,669 A | 3/1994 | Sampson | |
| 5,502,877 A | 4/1996 | Yocum | |
| 5,568,700 A | 10/1996 | Veneziano et al. | |
| 5,867,936 A | 2/1999 | Napolitano | |
| 5,956,814 A | 9/1999 | Choi | |
| 6,301,830 B1 | 10/2001 | Whipple | |
| 6,430,783 B1 | 8/2002 | Benoit | |
| D463,721 S | 10/2002 | Boucher | |

(Continued)

OTHER PUBLICATIONS

Bonnie Lee Appleton, "To Stake or Not to Stake", American Nurseryman, pp. 24-29, Nov. 15, 2007.

*Primary Examiner* — Andrea Valenti

(74) *Attorney, Agent, or Firm* — Sawyer Law Group, P.C.

(57) ABSTRACT

A tree tie and method of use is disclosed. The tree tie comprises a member. The tie member including a first end portion; a first tab coupled to the first end portion; a middle portion and one end of a middle portion coupled to the first tab. The tie member also includes an opposite end of the middle portion coupled to a second tab, a second end portion coupled to the second tab and a head portion coupled to the second end portion. The tree tie including a flexible hose surrounding the middle portion of the first member and being substantially held in place by the first and second tabs. Only flexible hose contacts the tree when the first member surrounds the tree.

18 Claims, 4 Drawing Sheets

U.S. PATENT DOCUMENTS

| | | |
|---|---|---|
| 6,481,070 B2 | 11/2002 | Caeran et al. |
| 6,702,239 B2 | 3/2004 | Boucher |
| 6,938,370 B2 | 9/2005 | Johns |
| 7,246,988 B1 * | 7/2007 | Zambetti ................ 414/809 |
| 7,661,224 B1 * | 2/2010 | Poyas ............................. 47/42 |
| 7,866,005 B2 * | 1/2011 | Vermeer et al. ............ 24/16 PB |
| 7,908,793 B2 * | 3/2011 | Decker ............................ 47/42 |
| 8,020,814 B2 * | 9/2011 | Geppert et al. .............. 248/74.3 |
| 2002/0148077 A1 | 10/2002 | Thompson |
| 2007/0007406 A1 | 1/2007 | Carlson et al. |

* cited by examiner

ZIP TREE TIE

CROSS-REFERENCE TO RELATED DISCLOSURES

Under 35 U.S.C. 120, this application is a continuation application and claims priority to U.S. application Ser. No. 12/182,126, filed Jul. 29, 2008, which claims the benefit of priority to U.S. provisional Application No. 60/952,856, filed Jul. 30, 2007.

FIELD OF THE INVENTION

The present invention relates generally to the tying of trees as they are growing and more particularly to tree ties utilized for such trees.

BACKGROUND OF THE INVENTION

In the growing and care of trees, it is often require and it is common practice to support trees against falling or being blown down and to control their direction of vertical growth. The most common and satisfactory way in which to support trees to attain the above ends is to set elongate vertical, rigid, support posts in the earth adjacent to the trees and to tie the trees to the posts. So as not to damage the trees, the tie means employed to tie the trees to the posts must be such that they will not cut into and damage the trees or abrade the trees upon anticipated relative movement between the trees and the posts.

To the above end, the prior art has found that a most satisfactory tie means or tree tie, is established by a short length of rubber or plastic garden hose engaged about the trunk of a tree to be tied and through which a length of wire or cable is engaged to effect securing the hose in place about the tree and to an adjacent supporting post. The hoses in such tie means prevent the wires of the ties from coming into contact with and cutting into the trees. The hoses are sufficiently large in diameter and sufficiently soft and flexible so that those forces which the tie means impart into the trees are effectively distributed and dispersed so as to prevent damage to the trees.

A principle shortcoming to be found in the above noted form of tree tie and in certain other, less sophisticated forms of ties provided by the prior art, resides in the fact that the tree ties do not provide or allow for growth of the trees and are such that if left engaged about their related trees for any appreciable period of time, they strangulate the trees by constricting and prevent the normal development and function of the cambrium layers of the trees. In those cases where the trees are not killed, the growth and development of the trees is adversely affected in one or more different ways.

In order to prevent tree ties from strangling or otherwise adversely affecting the growth of related trees, it is common and recommended practice to retie the tree at least once a year, prior to the commencement of each growing season. In doing so, the ties are set so as to allow for anticipated growth through the next growing season. Such practices are extremely costly and are subject to being carried out in an improper manner or forgotten.

Another shortcoming to be found in tree ties of the general character referred to above resides in the fact that they are most often, non-yielding in nature and are such that when their related trees are caused to move, bend or yield laterally away from their supporting posts, as by the force of sudden gusts of wind, the trees frequently snap and break at their points or lines of contact with the unyielding tree ties.

In order to overcome the above shortcoming, it is recommended procedure and practice to employ support posts which are not so heavy, strong and durable that they will not yield or fail before the trunks of their related trees will break. That is, good practice requires that the support posts be less strong than the tree trunks so that should the trees have to yield and bend under the forces of gale winds and the like, they will not be prevented from doing so by the tree tie means. As a result of the foregoing, in the case of trees which must be supported or tied for many years, it is frequently necessary that the support posts be replaced by larger and stronger posts every year or two, during the development of trees.

U.S. Pat. No. 4,222,198 entitled Tree Tie, discloses providing a tree tie that tries to address this problem by utilizing a collar with a helical spring element therein to allow for flexibility. This type of collar is difficult to manufacture as well as being expensive. What is needed is a system for that addresses the above identified issues, is cost effective and easy to manufacture. The present invention addresses such a need.

SUMMARY OF THE INVENTION

A tree tie and method of use is disclosed. The tree tie comprises a member. The tie member including a first end portion; a first tab coupled to the first end portion; a middle portion and one end of a middle portion coupled to the first tab. The tie member also includes an opposite end of the middle portion coupled to a second tab, a second end portion coupled to the second tab and a head portion coupled to the second end portion. The tree tie including a flexible hose surrounding the middle portion of the first member and being substantially held in place by the first and second tabs. Only flexible hose contacts the tree when the first member surrounds the tree.

DETAILED DESCRIPTION

The present invention relates generally to the tying of trees as they are growing and more particularly to tree ties utilized for such trees. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

There are several types of conventional tree ties. Wire through hose on rubber strap tree ties are well known. The major drawback of wire through hose products is installation time because a heavy gauge wire has to be twisted around a post to connect and sharp edges are exposed if not hammered toward stake. With wire products there is nothing to hold the hose within a defined area during normal weather patterns "winds" will slowly cause hose to move and expose wire to tree trunk, which in turn critically damages a tree. These products are very hard to adjust also because you have to untwist the wire to loosen and then re twist to reconnect. The problem here is that there usually isn't enough extra wire to lengthen tie because it is snipped off at the stake during original installation because of the safety issue of having a sharp wire exposed to the public. A tree tie in accordance with the present invention can be easily adjusted with a small screwdriver without removing any nail or staple. The extra cable is securely tucked into the hose and easily accessed for quick adjustments and the tabs allow for minimal lateral movement to allow for normal weather patterns so the hose will move slightly with the tree and cause less frictional damage. The tabs also keep the hose in place during infrequent harsher weather not allowing the cable to contact the trees sensitive cambian. To describe a tree tie in accordance with one embodiment, refer now to the following description in conjunction with the accompanying figures.

Figure 1:
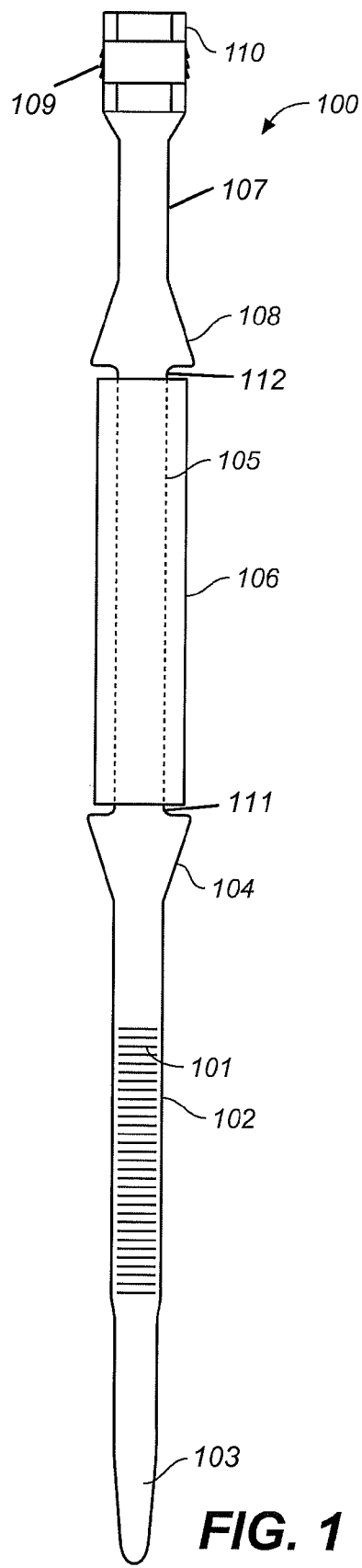
FIG. 1 illustrates a tree tie in accordance with an embodiment.

FIG. 1 illustrates a tree tie 100 in accordance with the present invention. The tree tie 100 includes a first member 102. The first member 102 includes a first end portion 103 and a first tab 104 coupled to the first end portion 103. The first member 102 includes a middle portion 105. One end of a middle portion 105 is coupled to the first tab 104 and an opposite end 112 of the middle portion 105 coupled to a second tab 108. The first member 102 includes a second end portion 107 coupled to the second tab 108 and a head portion 110 coupled to the second end portion 107. The tree tie 100 includes a flexible hose 106 surrounding the middle portion 105 of the first member 102 and being substantially held in place by the first and second tabs 104 and 108.

Figure 2:
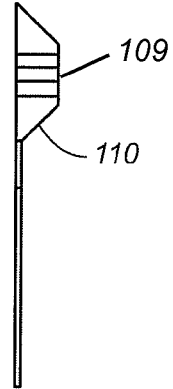
FIG. 2 illustrates a side view of the head.
Figure 3:
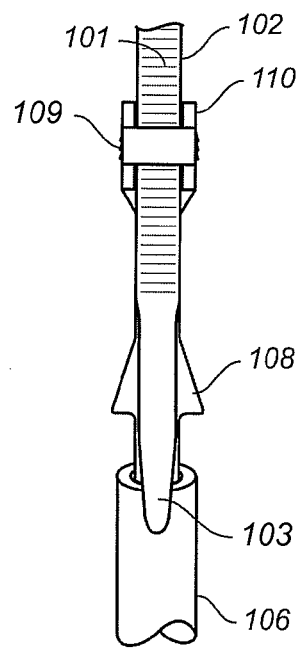
FIG. 3 illustrates the other end of tie inserted through head.
Figure 3A:
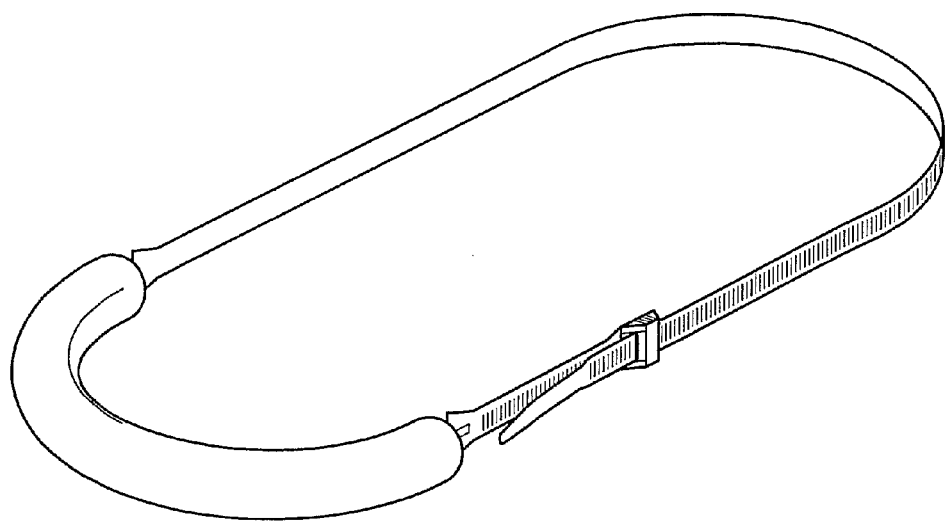
FIGS. 3A and 3B show a tree tie in accordance with an embodiment in a closed position at different angles.
Figure 3B:
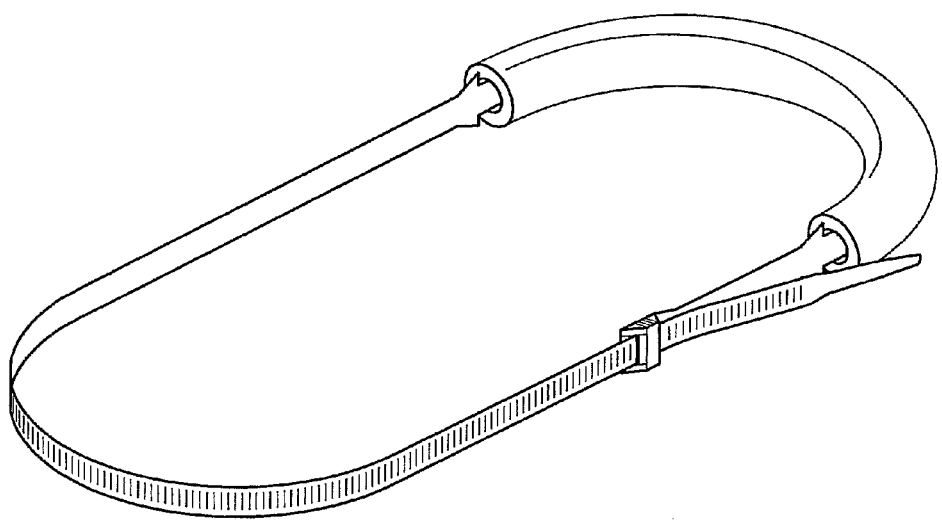

FIG. 2 illustrates a side view of the head portion 110. FIG. 3 illustrates the first end portion 103 of the first member 102 inserted through an aperture 109 of the head portion 110. FIGS. 3A and 3B illustrate the tree tie in a closed position at different angles. In these examples, the first end portion 103 includes plurality of raised members 101 which are compressed when passing through the aperture 109. Therefore, the tie 100 is locked in place to secure the tree in the proper position, this locking of the tree tie 100 can be permanent or can be reversed utilizing a tool.

For example, a thin metal strip may be used to enable removal of the tree tie without damage thereto. There can be two separate connection heads. One that is easily released with a screwdriver and will be used more frequently. Another type of tree tie is fixed. These types of tree ties will be used in areas more prone to vandalism, heavy foot traffic and harsher weather patterns. They are stronger and will be less prone to theft or vandalism. Transportation projects, schools, remote jobs, and high pedestrian used areas such as street scapes are examples of jobs that will use the more fixed tree tie. Homeowners and general use commercial jobs will more likely use the releasable tree tie.

Figure 4:
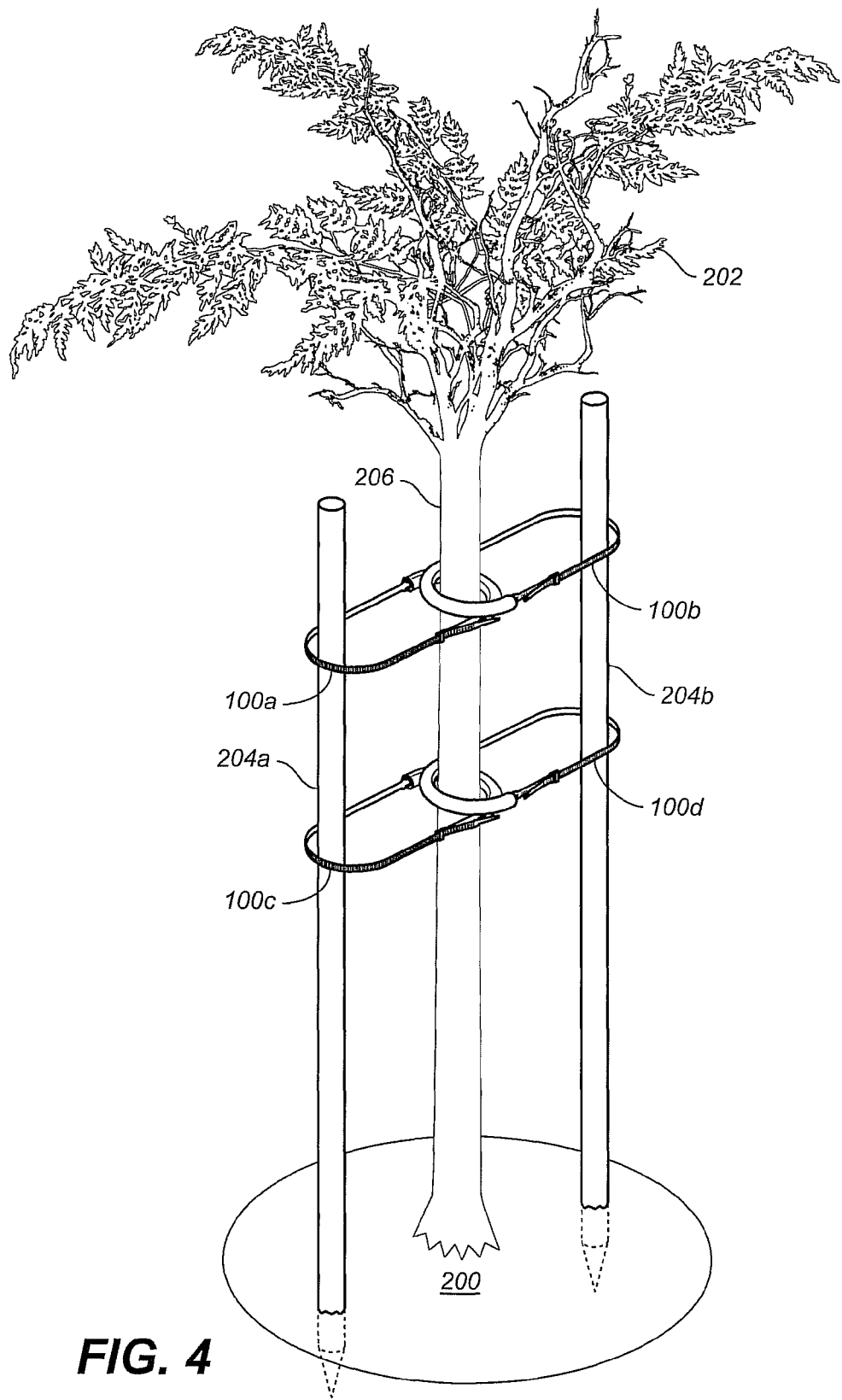
FIG. 4 illustrates a tree ties attached to a tree in one embodiment.

FIG. 4 illustrates a plurality of zip tree ties 100a-100d attached to a tree 206 in one embodiment in a figure eight configuration. Each zip tie 100a-100d is held in place by a flexible hose 106. The flexible hose 106, typically being made of rubber, protects the tree from scarring, which is a major problem with tree ties. The tabs 104 and 108 help hold the flexible hose 106 in place. In an embodiment, the first tab 104 is placed within 2" of the head portion 110 so the extra cable or tail of the tree tie 100 can be tucked cleanly inside the hose 106. This allows the installer to not have to cut off the excess cable and leaves more for future expansion of the tree tie 100 as the tree grows. Also this provides for clean finished product without any sharp edges.

Each zip tree tie 100a-100d wraps around a portion of a tree 206 and a stake 204a or 204b. The first zip tree tie 100a is attached approximately 4¼ inches from the tree crown 202. This height may vary depending upon the height of the tree 206 and the size of the tree crown 202. For example, a 2" stake 204a is installed at a minimum of 12" from both sides of the tree 206. The zip tree tie 100a wraps around one stake 204a and halfway to three-quarters of the way around one portion of the tree 206. Another zip tree tie 100b wraps around a second stake 204b and halfway to three-quarters of the way around a second portion of the tree 206. In high wind areas a second set of tree ties 100c and 100d is necessary. Typically each of the tree ties 100a-100d is connected to the stake with a stable or fastener. There are both releasable and fixed tree ties. Either could be used, but the releasable is better.

Although two sets of four ties 100a, 100b, 100c and 100d is required for high wind areas, additional ties and sets may be necessary for a larger tree or other exceptional circumstances, and these would be within the spirit and scope of the present invention.

Figure 5:
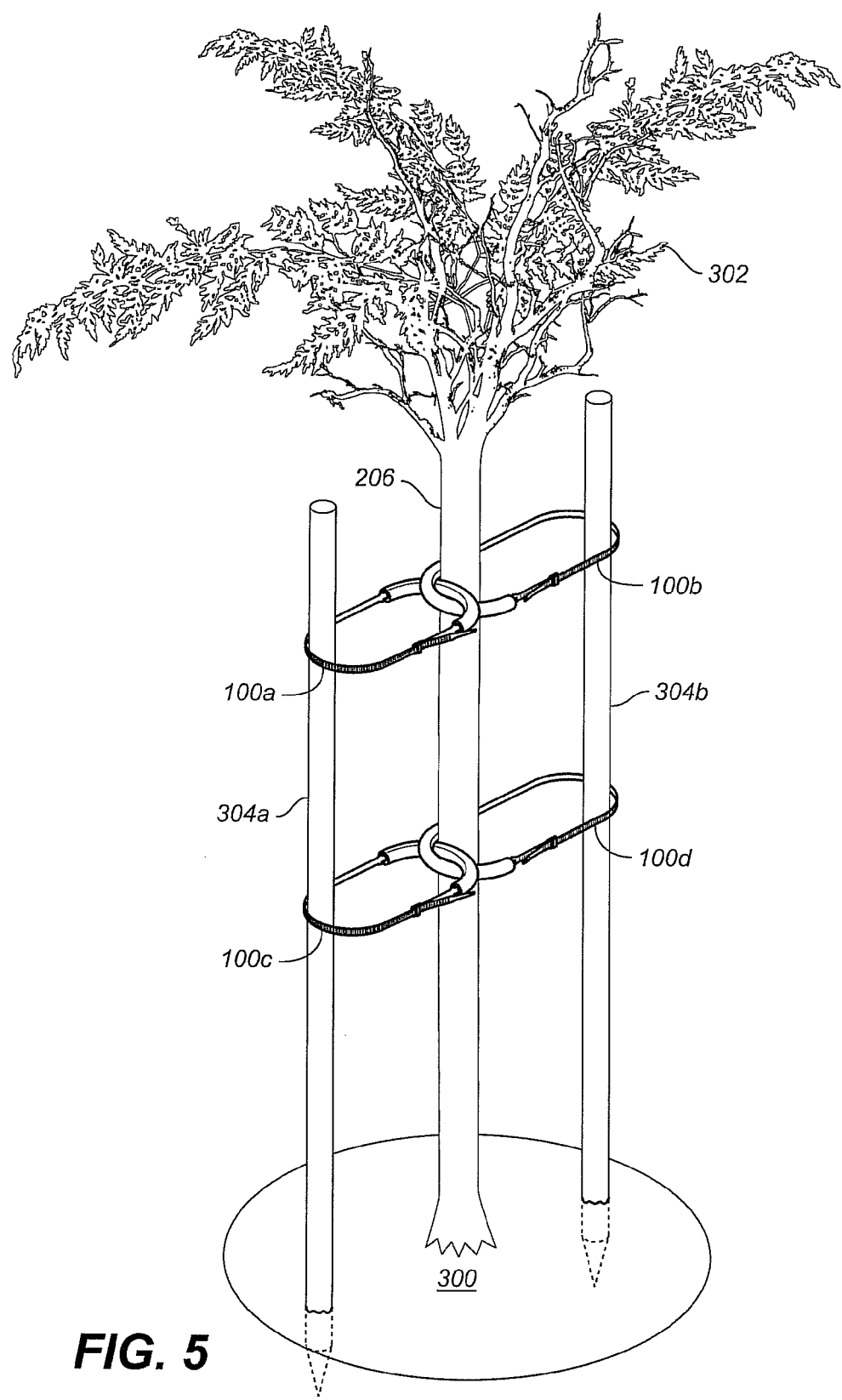
FIG. 5 illustrates tree ties attached to a tree in a second embodiment.

FIG. 5 illustrates zip tree ties 100a-100d attached to a tree 206 in a second embodiment in a chain configuration. In this embodiment, tie 200b surrounds the tree; and then tie 200a attaches to the tie 200b. Similarly, if a second set of ties is requested, tie 200d surrounds the tree; and then tie 200c attaches to tie 200d.

Accordingly, a tree tie system and method of use is disclosed that has several advantages over conventional tree tie systems. Firstly, it simple and easy to attach to different types of trees. It is relatively inexpensive and utilizes parts which can be easily manufactured. The flexible hose minimizes scarring of the tree-trunk in which tree tie is utilized which minimizes damage thereto. Furthermore, the tree ties can be utilized in a variety of configurations and that use would be within the spirit and scope of the present invention.

Although the present invention has been described in accordance with the embodiments shown, one of ordinary skill in the art will readily recognize that there could be variations to the embodiments and those variations would be within the spirit and scope of the present invention. For example, the tree ties can be made of a variety of materials, including but not limited to plastics, rubber, metals or the like. Furthermore, the flexible hose can be of a variety of types as long as scarring of the tree is minimized. The tree ties can come in many different colors. For example in the Midwest tan colored tree ties may be used, on the East coast black, green and tan ties, and on the West coast black, green and tan colors may be used. Furthermore, a black tree tie is a natural UV inhibitor. In another embodiment, an UV inhibitor can be incorporated into the product to protect against sun damage. The tree ties can also come in various sizes, for example, 60" tree tie could be provided to accommodate the general application on the East coast and the Midwest. They generally use metal barb wire stakes that are staked further away from the tree, thus the need for a longer tree tie. Accordingly, many modifications may be made by one of ordinary skill in the art without departing from the spirit and scope of the appended claims.

What is claimed is:

1. A tree tie comprising:
   a first member, the first member including a first end portion;
   a first tab coupled to the first end portion, a middle portion, one end of a middle portion coupled to the first tab, an opposite end of the middle portion coupled to a second tab, a second end portion coupled to the second tab and a head portion coupled to the second end portion; and a single flexible hose surrounding the middle portion of the first member, wherein one end of the flexible hose is proximate to the first tab, and wherein the opposite end of the flexible hose is proximate to the second tab, whereby the flexible hose is substantially held in place by the first and second tabs, wherein only the single flexible hose surrounding the middle portion of the first member contacts a tree when the first member surrounds a tree, and wherein the first end portion is inserted in and secured to the head portion to allow for the tree tie to surround a tree.

2. The tree tie of claim 1, wherein the flexible hose comprises a rubber flexible hose.

3. The tree tie of claim 1, wherein the first end portion includes a plurality of raised portions therein which engage with an aperture on the second end portion.

4. The tree tie of claim 1, wherein the first end portion is releasable from the head portion.

5. The tree tie of claim 1, wherein the second tab is within a predetermined distance of the head portion to allow the first end portion to be tucked inside of the hose, wherein the first end portion is inserted into the head portion.

6. The tree tie of claim 1, wherein the first end portion is inserted into and secured to the head portion to allow for the tree tie to surround a tree in a plurality of lengths.

7. The tree tie of claim 1, wherein the first end portion is inserted into and secured to the head portion, further wherein the first end portion is releasable from, and reinsertable into the head portion.

8. The tree tie of claim 7, wherein the head portion features a plurality of releasability options.

9. A system for tying a tree comprising:

a plurality of tree ties; each of the tree ties comprising a first member, the first member including a first end portion;

a first tab coupled to the first end portion, a middle portion, one end of a middle portion coupled to the first tab, an opposite end of the middle portion coupled to a second tab, a second tab portion coupled to the second tab and a head portion coupled to the second end portion;

and a single flexible hose surrounding the middle portion of the first member, wherein one end of the flexible hose is proximate to the first tab, and wherein the opposite end of the flexible hose is proximate to the second tab, whereby the flexible hose is substantially held in place by the first and second tabs, wherein only the single flexible hose surrounding the middle portion of the first member contacts a tree when the first member surrounds a tree, and wherein the first end portion is inserted in and secured to the head portion to allow for the tree tie to surround a tree.

10. The system of claim 9, wherein the plurality of tree ties are in a figure eight configuration.

11. The system of claim 9, wherein the plurality of tree ties are in a chained configuration.

12. The system of claim 9, wherein the flexible hose comprises a rubber flexible hose.

13. The system of claim 9, wherein the first end portion includes a plurality of raised portions therein which engage with an aperture on the second end portion.

14. The system of claim 9, wherein the first end portion is releasable from the head portion.

15. The system of claim 9, wherein the second tab is within a predetermined distance of the head portion to allow the first end portion to be tucked inside of the hose, wherein the first end portion is inserted into the head portion.

16. The system of claim 9, wherein the first end portion is inserted into and secured to the head portion to allow for the tree tie to surround a tree in a plurality of lengths.

17. The system of claim 9, wherein the first end portion is inserted into and secured to the head portion, further wherein the first end portion is releasable from, and reinsertable into the head portion.

18. The system of claim 17, wherein the head portion features a plurality of releasability options.

* * * * *